United States Patent [19]
van der Lely

[11] 4,287,710
[45] Sep. 8, 1981

[54] HAY MACHINE FOR WORKING CROP LYING ON THE GROUND

[76] Inventor: Cornelis van der Lely, 7, Brüschenrain, Zug, Switzerland

[21] Appl. No.: 46,238

[22] Filed: Jun. 7, 1979

[30] Foreign Application Priority Data

Jun. 8, 1978 [NL] Netherlands .................. 7806224

[51] Int. Cl.³ ............................................. A01B 33/00
[52] U.S. Cl. ....................................... 56/372; 56/364; 172/92
[58] Field of Search ................. 56/372, 369, 345, 364, 56/344, 220, 14.4; 172/100, 91, 92, 94

[56] References Cited

U.S. PATENT DOCUMENTS

| | | | |
|---|---|---|---|
| 116,297 | 6/1871 | Gibbs | 172/94 |
| 2,795,100 | 6/1957 | Sund | 56/345 |
| 3,229,454 | 1/1966 | Oshanyk | 56/364 |
| 3,236,038 | 2/1966 | Gates et al. | 56/364 |
| 3,957,122 | 5/1976 | Lely | 172/92 |
| 4,187,666 | 2/1980 | Mulilwain | 56/364 |

*Primary Examiner*—Robert A. Hafer
*Attorney, Agent, or Firm*—Mason, Mason and Albright

[57] ABSTRACT

A hay machine for working crop lying on the ground, such as a side-delivery rake, a tedder or a combined hay-making machine has a tined carrier for redepositing worked crop on the ground and comprises rows of tines which, in operation, are rotated in a forward direction while being turned oppositely over at least part of their path near the ground. The tines, which are located near the ground, extend horizontally and in a forward direction with respect to the direction of machine movement. The carrier preferably mounts three rows of elongated tines that are each shaped as a lazy S and pointed at each end. A sun wheel and planet gear system drives the carrier as a whole while turning the tines to pick up crop, raise and deposit same to the rear of the carrier. The orientation of the tines can be adjusted by displacing the sun wheel relative to the frame and fixing same in position. A crop crusher is mounted adjacent the paths of the tines and spring means urges the crusher to adjusted positions in which crop is intersepted and worked further.

12 Claims, 9 Drawing Figures

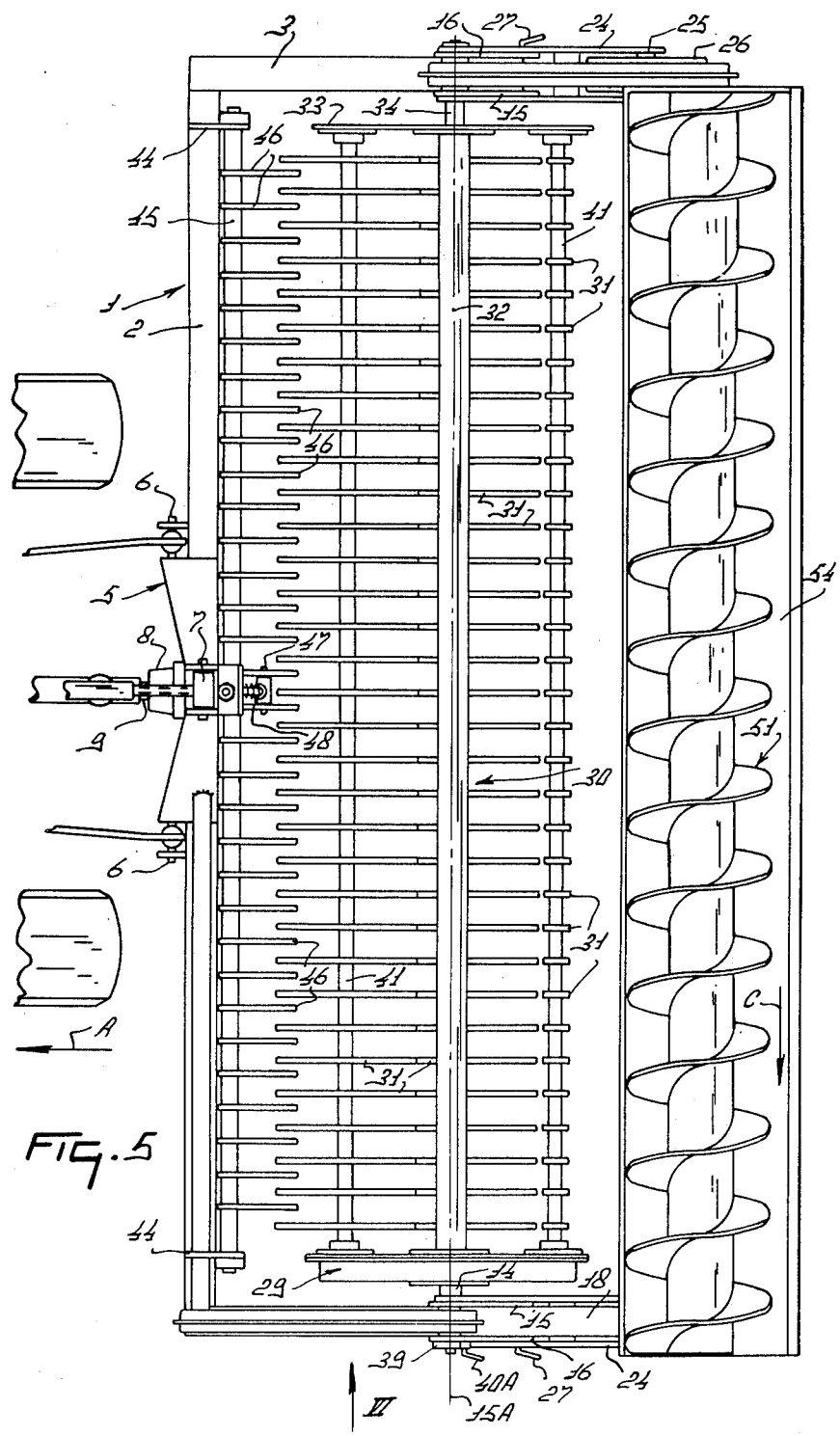

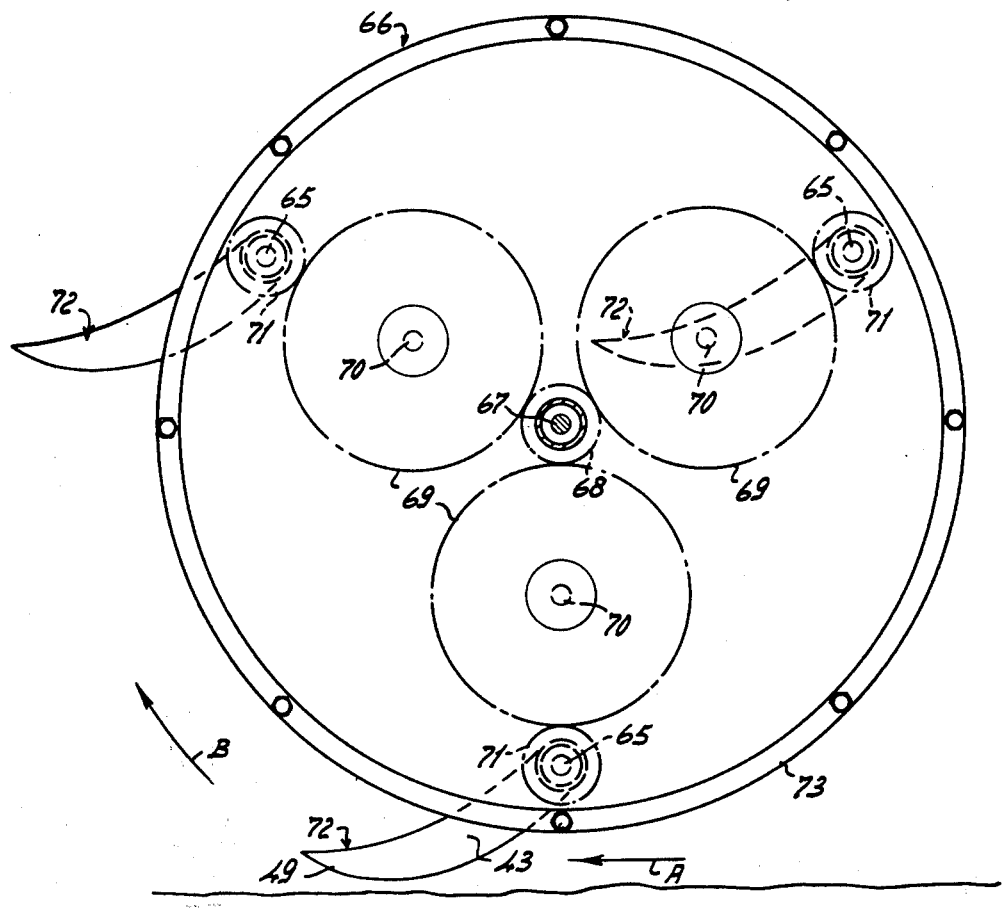

HAY MACHINE FOR WORKING CROP LYING ON THE GROUND

This invention relates to a hay machine for working crop lying on the ground, such as a side-delivery rake, a tedder or a combined hay-making machine, said machine redepositing worked crop on the ground and comprising tines which, in operation, are driven in forward direction over at least part of their path near the ground.

Known machines of this kind have the disadvantage that the crop, when collected by the tines, is compressed to some extent. Knotted heaps of crop, however, can hardly be worked by balers and loading wagons. On the other hand, the crop will be mixed with clods and stones.

According to the invention, in operation, tines moving near the ground are pivotably mounted in such a way that they extend in forward direction with respect to the direction of movement.

In this way the crop can be picked up by tines that move under the stalkes and the crop will be treated carefully.

For a better understanding of the present invention and to show how it may be carried into effect, reference will now be made, by way of example only, to the accompanying drawings, in which:

FIG. 5 is a plan view of a second embodiment of a machine including a device for picking-up crop;

FIG. 9 is a side elevation of a further embodiment according to the invention.

Figure 1:
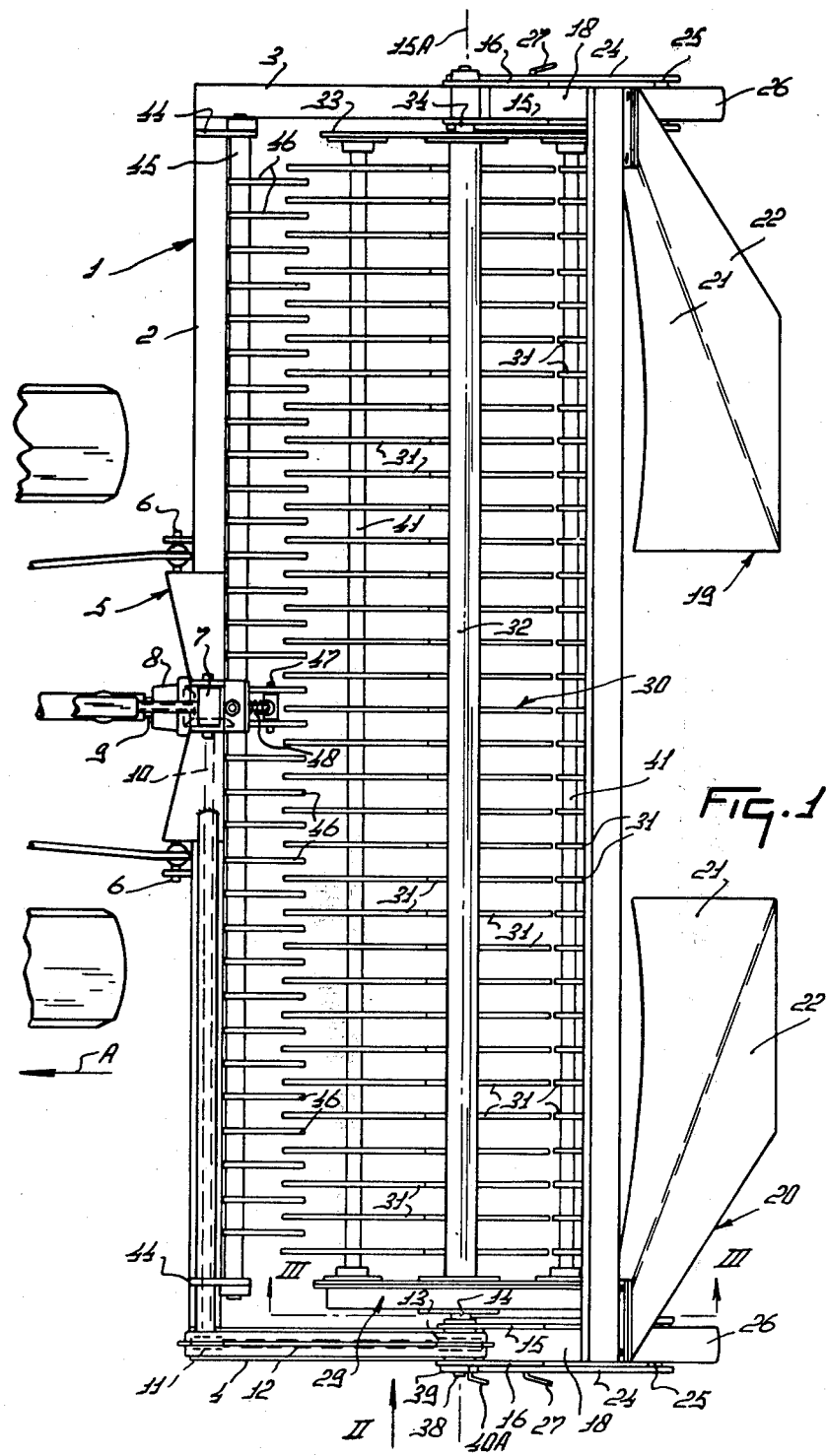
FIG. 1 is a plan view of a first embodiment of a machine including a device for picking-up crop.
Figure 2:
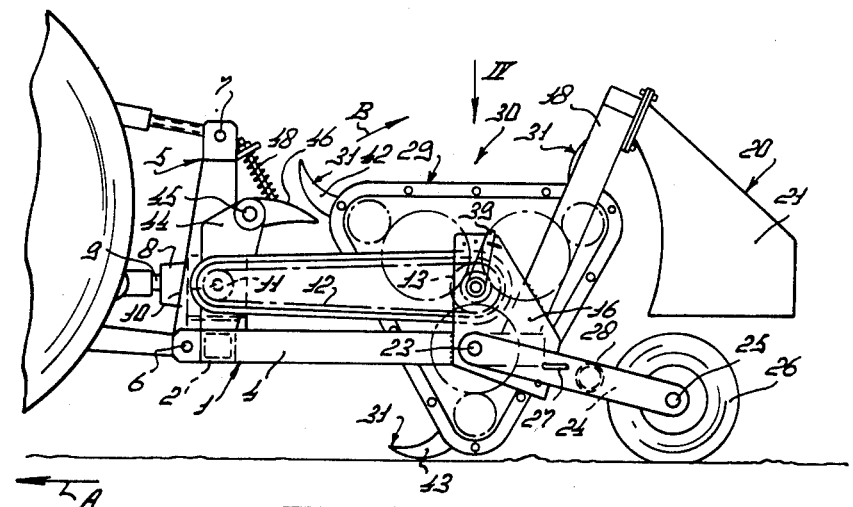
FIG. 2 is a view in the direction of the arrow II in FIG. 1.
Figure 3:
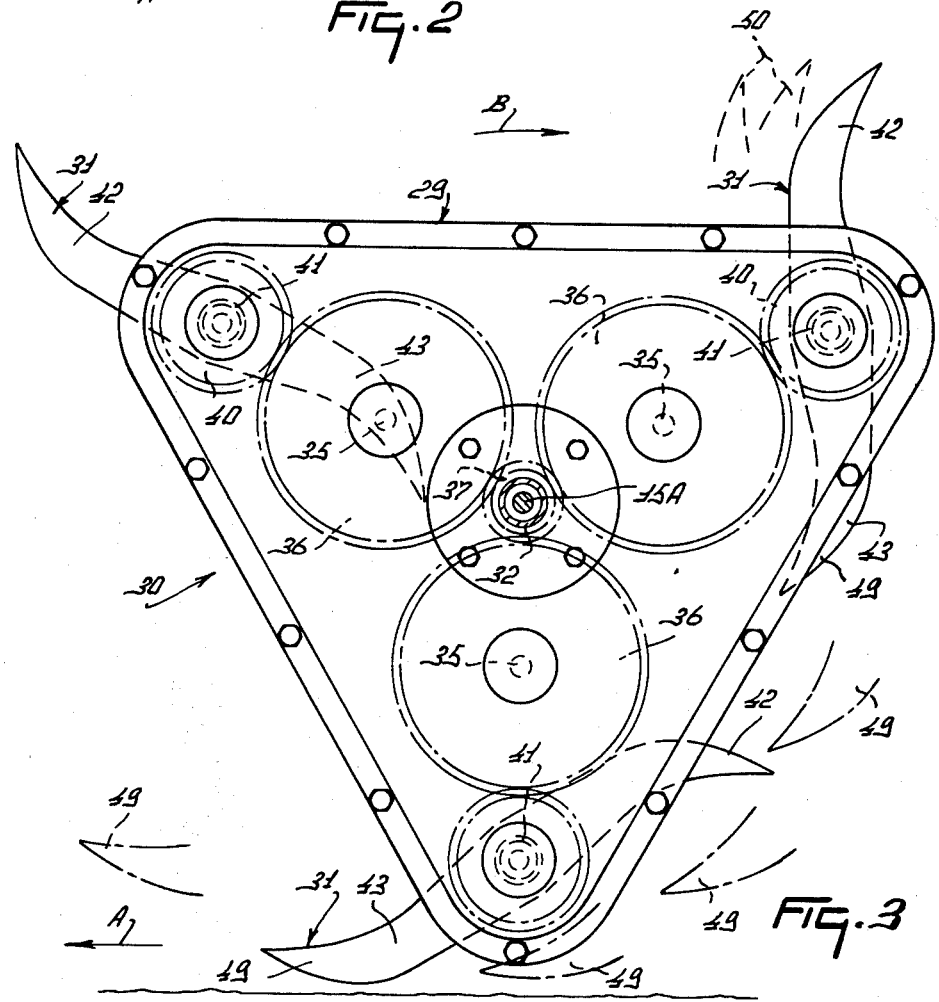
FIG. 3 is an enlarged view in the direction of the arrow II of part of the device of FIG. 1.
Figure 4:
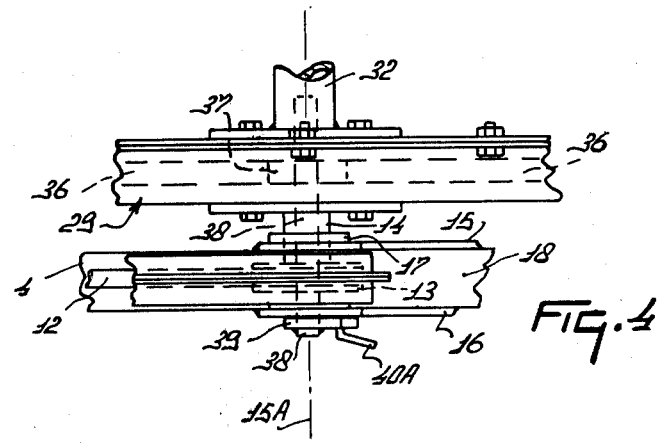
FIG. 4 is a view in the direction of the arrow IV in FIG. 2.

The implement or machine illustrated in FIGS. 1 to 6 comprises a U-shaped frame 1 which is substantially horizontal. The frame 1 comprises a frame beam 2, extending transversely of the intended direction A of operative travel of the machine, and two frame beams 3 and 4 which are connected one at each end of the beam 1, and which extend parallel to the direction A. Near its middle, the frame beam 2 is provided on its top side with a trestle 5 having the shape of an inverted V, when viewed in the direction A. Near the two lower ends of the trestle 5 and near its top, there are connecting means 6 and 7 for hitching the machine to the three arms of a three-point lifting device of a tractor drawing the machine. The frame 1 is symmetrical about a vertical central plane which extends in the direction A, and in this plane there is a gear box 8, from which projects an input shaft 9, the centerline of which is located in the central plane. A pinion transmission housed in the gear box 8 couples the input shaft 9 with a driving shaft 10, which is located within a protective tube above one half of the beam 2. Near that end of the frame beam 2 which meets the frame beam 4, the driving shaft 9 projects from the end of the protective tube and the projecting end is provided with a pulley 11 (FIG. 2) over which run one or more driving belts 12 for driving a pulley 13 which is rigidly secured to a hollow shaft 14; the centerline 15A of the shaft 14 is parallel to the frame beam 2 and is thus horizontal and extends transversely of the direction A (FIGS. 2 and 4).

At each side of the machine there are two upwardly extending plates 15 and 16 (FIGS. 1, 2 and 4) disposed one on each side of each frame beam 3 or 4 respectively. Most of each plate 15 or 16 extends above its frame beam 3 or 4, but there is a part which extends below it, this part having a lower edge which is inclined downwardly from front to rear. The inboard plate 15 of each pair of supports holds the shaft 14 in a bearing 17 (FIG. 4).

A carrier 18 is disposed between each pair of plates 15 and 16. The carrier 18 is rigidly secured to the top of the respective frame beam 3 or 4 and is inclined upwardly from front to rear. At the upper end of each carrier 18, i.e. at that end away from its frame beam 3 or 4, there is a guide member 19 or 20 for guiding crop. The guide members 19 and 20 extend from the sides of the machine towards the middle. Each guide member 19 or 20 comprises a plate 21 and 22, the two plates being inclined to one another and being fastened to the end of the respective carrier 18 in a manner such that they slope downwardly away from the carrier. The plane of each plate 21 intersects the ground surface approximately at the middle of the machine along a line parallel to the direction A. The plate 22 extends from the rear edge of the plate 21 and is inclined upwardly from front to rear in a manner such that crop entering the guide members 19 and 20 slides down towards the middle of the machine and is discharged as a swath on a strip of ground between the two guide members. The two guide members 19 and 20 are detachable from the carriers 18. A pivotal shaft 23 is supported in each frame beam 3 and 4 and projects from each of the two substantially vertical plates 15 and 16 on each side. A pair of pivotal arms 24 is pivotable about each shaft 23 and is fixable in any one of a plurality of positions. The arms 24 on each side of the machine extend away from the associated pivotal shaft 23 and are inclined downwardly from front to rear; the arms 24 engage the outer surfaces of the plates 15 and 16. The rear ends of each pair of pivotal arms 24 carry an axle 25 of a ground-engaging wheel 26; the axle 25, like the pivotal shaft 23, is parallel to the frame beam 2. Each pair of pivotal arms 24 can be fixed in any one of a plurality of positions by a pin 27, which can be inserted into holes formed in the plates 15 and 16 and lying on an arc centred on the pivotal shaft 23. The two pairs of pivotal arms 24 of the two ground wheels 26 are interconnected by a tube 28 extending over the whole width of the machine.

FIG. 4 illustrates the hollow shaft 14 as being rigidly connected to a flat support 29 which is part of a rotatable unit 30 of the device for picking-up crop. The support 29, which is arranged at that end of the unit 30 to which the drive transmitted by the pulleys 11 and 13 and the belts 12 is applied, constitutes a closed gear box accommodating pinions for working members of the unit in the form of tines 31. The support 29 has the shape of an equilateral triangle with rounded corners. The support 29 and the rest of the unit 30 are rotatable about the centerline 15A, which is horizontal and extends transversely of the direction A. On the side of the support 29 facing inwardly of the machine there is a shaft 32 which is rigidly secured to the support 29. The shaft 32 is aligned with the centerline 15A and is provided with an end plate 33 on the side of the unit away from the support 29. The end plate 33 has generally the same shape as the support 29. The end plate 33 is supported by a shaft 34, which is also aligned with the centerline 15A, in the plates 15 and 16 fastened to the frame beam 3. The support 29, the shaft 32 and the end plate 33 comprise a carrier member of the unit 30.

The support 29 supports three shaft portions 35, the centerlines of which are parallel to, and the same distance from, the centerline 15A. The lines connecting the centerlines of the shaft portions 35 with the centerline 15A are inclined to one another by 120°. Each shaft portion 35 is provided with a spur pinion 36 located in the support 29 and meshing with a central pinion or sun wheel 37, which is aligned with the centerline 15A. The pinion 37 is fastened to a shaft 38 (FIG. 4), which is also aligned with the centerline 15A and is inside the hollow shaft 14. The shaft 38 is freely rotatable in a wall of the support 29 facing inwardly of the machine and is also freely rotatable with respect to the shaft 14. The shaft 38 passes through the hub of the pulley 13 and projects from the outboard side of the plate 16. To this projecting end of the shaft 38 is welded a setting plate 39 (FIG. 4) having a hole for receiving a locking pin 40A, which can be inserted into any one of a plurality of holes in the plate 16, these holes being arranged on a circle centered on the centerline 15A. In this way the position of the shaft 38, and hence of the pinion 37, with respect to the frame of the machine can be adjusted and fixed.

Each of the three pinions 36 is in mesh with an associated pinion 40 (FIG. 3). The centerlines of each pinion 40, its pinion 36 and the pinion 37 lie on the same straight line. The pinions 36, 37 and 40 constitute a planetary gear wheel system. The diameter of each pinion 40 is double that of the sun wheel 37. As shown in the elevational view of FIG. 3 each pinion 40 is located at a corner of the triangular support 29. Each pinion 40 is rigidly mounted on a shaft 41 which serves as a tine carrier and covers the whole width of the unit 30. The three shafts 41 are freely rotatable in the end plate 33 at the end away from the support 29.

Across the width of the machine, each of the three shafts 41 is provided with a large number of tines 31. The distance between each two adjacent tines on the same shaft 41 is about 15 to 30%, preferably about 20% of the overall length of a tine 31. Each tine 31 appears straight throughout its length when viewed on plan (FIG. 1) and is made from a piece of steel sheet, which is perpendicular to the shaft 41 and hence parallel to the direction A.

Each tine 31 has two portions 42 and 43 located one on each side of the associated shaft 41 (FIG. 3); these portions 42 and 43 could be regarded as separate tines, which may be off-set from one another, for example along the length of the associated shaft 41. Each portion 42 and 43 has an inner part which is substantially radial to the shaft 41 and the edges of which converge slightly away from the shaft 41. This inner part merges into an outer part which curves forwardly with respect to the direction of operative rotation of the shaft 41. Considering the tine nearest the ground in FIG. 3, it will be seen that the lower edge of the inner part merges smoothly along an arc with the lower edge of the outer part and, at one point, extends horizontally. This also applies to the other edges of the inner and outer parts of the tine portions 42 and 43. The outer part of each tine portion 42 or 43 terminates in a sharp point and, as viewed in FIG. 3, the bisector of the angle between the edges near the point of the operative tine portion 43, i.e. that located nearest the ground, passes the associated shaft 41 on the side away from the centerline 15A. Consequently, the point of the operative tine portion points forwards with respect to the direction B of operative rotation. In side elevation, the shape of the tine portion 43 is such that, if the tine portion 43 were turned through 180° about the centerline of the associated shaft 41, the edges of the tine portion 43 would coincide with those of the tine portion 42. For the further design of the tines 31 reference is made to FIG. 3.

FIGS. 1 and 2 show, near each side of the machine, an upwardly directed support 44 of sheet material which extends parallel to the direction A. Each of the two supports 44 is fastened on the bottom side to the frame beam 2. The top ends of the supports 44 are slightly to the rear of the frame beam 2. The supports 44 hold, near these top ends, a supporting shaft 45, which is parallel to the frame beam 2. The supporting shaft 45 is freely pivotable in the two supports 44. The supporting shaft 45 is provided with a large number of flat crushing members 46 which point to the rear in their operative state. Each member 46 is generally triangular. The crushing members 46 are rigidly secured to the supporting shaft 45. Each crushing member 46 is located midway between the paths of two adjacent operative portions of tines 31 of the unit 30 and projects approximately as far as the circumference of the support 29. At the center of the row of crushing members 46, two of the crushing members are interconnected by means of a releasable pin 47, which is located at a distance from the supporting shaft 45. A compression spring 48 exerts a force on the pin 47. The spring surrounds a rod extending between the pin 47 and the top side of the trestle 5 at the location of the coupling means 7. The rod inside the spring 48 acts as a stop to limit downward movement of the crushing members 46 so that these members are held in the end position shown in FIG. 2 by the force of the spring 48. Near its top end, the rod is adjustable so that after a change in position of the rod all crushing members are in different end positions around the shaft 47. Since all of the crushing members 46 are rigidly secured to the supporting shaft 45, the compression spring 48 operates to oppose upward movement of all of the crushing members together.

During operation the machine is hitched by the coupling means 6 and 7 of the trestle 5 to the three-point lift of a tractor. An auxiliary shaft fastened to the power take-off shaft of the tractor is connected with the input shaft 9 of the gear box 1 so that the driving shaft 10 and hence the pulley 11 are driven. The pulley 11 drives, through the belts 12, the pulley 13 which, by means of the shaft 14 rigidly secured to the pulley 13, cause the triangular support 29 to rotate about the centerline 15A (FIG. 4) in the direction B (FIG. 3) so that the lower side of the unit 30 moves over the ground in the direction A. Since the support 29 is rigidly connected with the end plate 33 by the shaft 32, the end plate 33 rotates with the support 29.

During rotation of the support 29, the sun wheel 37 remains stationary with respect to the frame of the machine, since the shaft 38 which carries the pinion 37 and is located inside the shaft 14 is fixed by the pin 40A in a set position relative to the plate 16 and hence to the frame. During rotation of the support 29 the shaft portions 35 and the shafts 41 will also rotate about the centerline 15A. Since the pinion 37 is stationary and the diameter of the pitch circle of the pinion 37 is half the diameters of the pinions 40, the pinions 40 and also the shafts 41 and the tines 31 will rotate with respect to the support 29 with an angular velocity which is half that of the support 29, and in a sense opposite that of the support 29 and therefore opposite the direction B. This means that after one tine portion 43 or 42 of each tine 31 has occupied an operative position near the ground, the other tine portion 42 or 43 of that tine 31 will be in the same operative position near the ground after the support has turned through 360°.

FIG. 3 shows a plurality of positions 49 of a tine point moving in the direction of rotation B(FIG. 3) from above towards the operative position at the ground and beyond, the point, when near the ground, being directed to the front substantially in the direction A. Associated positions of the support 29 are omitted for the sake of clarity. From the positions 49 of the tine point it will be appreciated that the lower edge of the tine, at the point, coincides with the ground surface, when the tine just arrives near the ground (FIG. 3) and then moves between the stubbles. Therefore, as the tine moves forwardly over the ground, the crop is shifted along the upper edge of the tine onto the operative tine portion. At the same time, bits of crop lying between in stubble are picked-up, since the lower edge of the tine portion is in contact with the ground in the stubble. The tine then rotates upwardly so that the arcuate transition region between the lower edges of the outer part and the inner part bears on the ground surface (this is the position indicated by solid lines at the bottom of FIG. 3) whereby the tine point is now at a distance above the ground. The crop lying on the upper edges of all operative tine portions 42 or 43 on the lowermost shaft 41 is now carefully carried upwardly as will be seen from the point 49 furthest to the left. The ratio between the speed of forward travel and the speed of rotation of the unit 30 is such that the next following tines engage the crop at the place where the preceding tines left the ground. Consequently this operation of the tines results in a thorough picking-up of the crop without the tines scraping the soil and without contamination of the harvested crop.

It is to be noted, that the tips of the tines trace a path, that is, as seen from points of view located outside this path, in all points of said path, curved in a convex way.

FIG. 3 shows a number of adjusted positions 50 of the tines 31 with respect to the position of the support 29 for matching different working conditions. The adjustment can be performed by turning the sun wheel 37 by turning of the shaft 38 with respect to the plate 16, the shaft 38 being fixed in the selected position by the locking pin 40A.

During movement of an operative tine portion in upward direction and in the direction B, the crop is conveyed past the crushing members 46 so that it is crushed before being deposited. By releasing the pin 47, the supporting shaft 45 together with the crushing members 46 can be turned upwardly so that the crushing members are put out of operation, for example if the nature of the crop makes crushing unnecessary or undesirable (such as with clover). The crop lying on the tine portions is carried along over the top of the unit 30 until the tine portions arrive at the position indicated in the right-hand upper part of FIG. 3. Premature release of crop is avoided by the comparatively low speed of rotation of the unit 30 and the fact that the operative tine portions are moving backwards with respect to the support 29. In certain circumstances, the speed of rotation of the unit 30 could be considerably lower than that of a conventional drum tedder. The premature release is furthermore avoided by the forwardly pointing position of the tines portions. This forwardly pointing position of the end portion of the tine portions may, if desired, be more pronounced than is indicated in the embodiment of FIG. 3. This forward orientation of the points of the tine portions means that the ends of the tine portions are directed substantially vertically and the crop is released in the position shown in the right-hand upper part of FIG. 3 so that the crop falls at a small distance behind the unit 30. In the region near the two ends of the unit 30 the crop is thrown towards the guide members 19 and 20, after which the crop is delivered along the plates 21 to fall as a central swath, the width of which corresponds to the distance between the inner ends of the guide members 19 and 20. If desired, the guide member 19 and 20 may be removed so that the crop is deposited over the whole width of the unit. The working width of the device operating thus as a tedder is preferably about 270 centimeters.

In conjunction with the adjustment of the desired position 50 of the tine relative to the support 29, the height of the unit about the ground can be adjusted by turning the pivotal arms 24 with respect to the frame of the device and by fixing them in different positions with the pins 27, so that the ground wheels 26 determine the new position of the device with respect to the ground. The pivotal shafts 23 of the arms 24 may be fastened to the frame beams 3 and 4, if desired, at a place nearer the front so that the ground wheels 26 are nearer the place where the tines are nearest the ground in order to provide an optimum following of unevennesses of the ground. It should be noted that the unit 30 may be equipped with more than three rows of tines.

Figure 6:
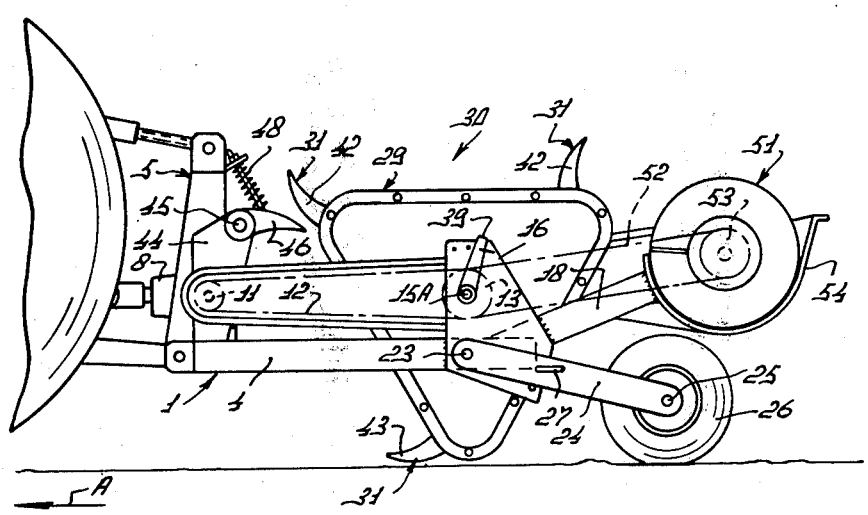
FIG. 6 is a view in the direction of the arrow VI in FIG. 5.

In respect of the operation of the device for picking up crop including the unit 30 and the crushing member 46, the machine shown in FIGS. 5 and 6 corresponds with that of FIGS. 1 to 4, but the crop delivery part for swath formation is constructed as a conveyor, which, as illustrated, is a worm conveyor 51, the rotary axis of which is substantially horizontal and perpendicular to the direction A. The worm conveyor 51 is located in the region occupied in the first embodiment by the guide members 19 and 20. The crop delivered by the tines 31 on the top and rear sides of the unit 30 drops into the region occupied by the worm conveyor 51, which conducts it away in the direction C (FIG. 5) and deposits it on one side of the machine in the form of a swath. On the side of the machine provided with the pulley 13 the end of the worm conveyor 51 is provided with a pulley 53, which is driven by one or more belts 52 from the pulley 13. The worm conveyor 51 is surrounded on its front, bottom and rear sides by a trough 54, which guides the crop in the direction C.

Figure 7:
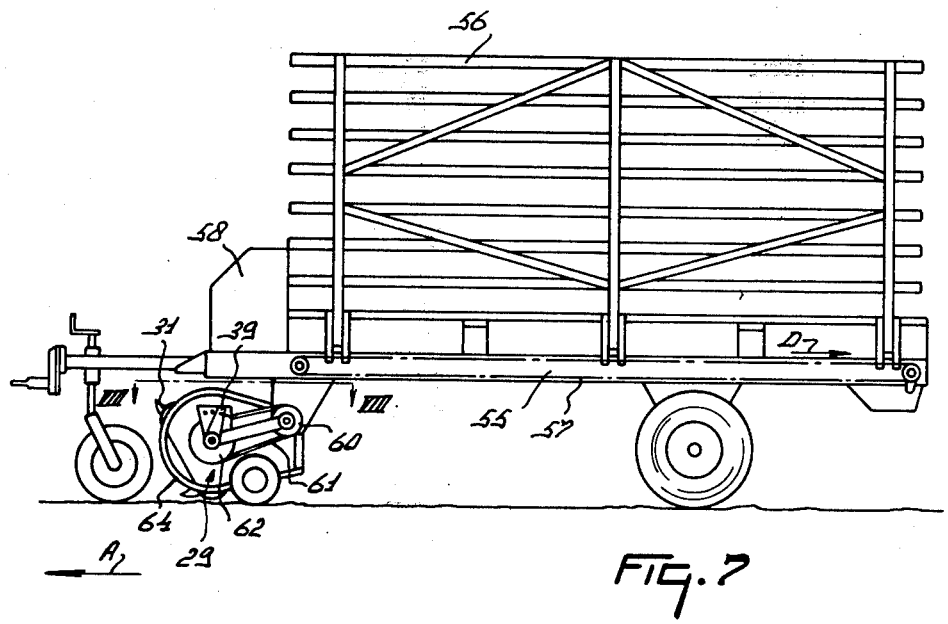
FIG. 7 is a side view of a trailer including a device for picking-up crop.
Figure 8:
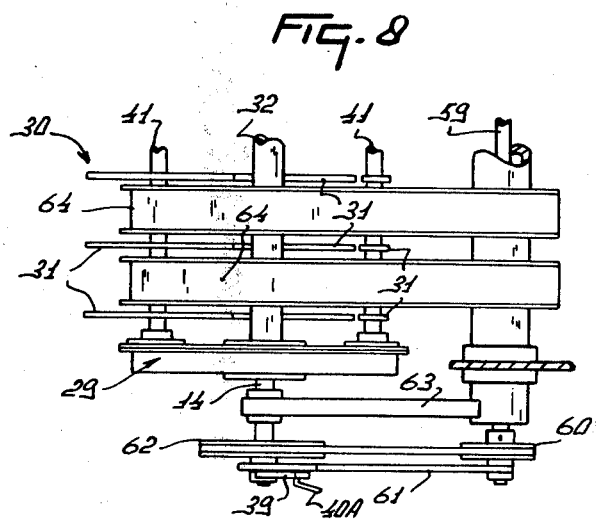
FIG. 8 is a view taken on the line VIII—VIII in FIG. 7.

A further use of the device for picking-up crop is shown in FIGS. 7 and 8, where it serves to raise crop to a self-loading trailer. The trailer comprises a frame 55 having side walls 56 to define a load space. At the level of the horizontal frame 55 there is a conveyor or roller floor 57 for transporting the crop introduced by the device into the loading space or for discharging the crop contained in the loading space 56 in the direction D. The roller floor 57, the device for picking up crop and an advancing member arranged behind that device are driven by a driving mechanism 58, which is powered through an auxiliary shaft by a tractor. FIG. 8 shows that the device for picking up crop is driven through a driving shaft 59, which drives the shaft 14 through a pulley 60, a belt 61 and a pulley 62. The shaft 14 is supported by the frame 55 in a bearing arranged at the end of a carrier 63, which is rigidly secured to the frame 55. The construction of the unit 30 is similar to that of the two preceding embodiments. From FIGS. 7 and 8 it will be seen that a further precaution is taken by arranging arcuate guide plates 64 between each two adjacent tines 31 of the unit 30. The shape of these plates is such that, in the operative region, the points of the tines protrude generally horizontally between the guide plates in the lower region of the plates 64. Where large quantities of crop are to be picked-up, the crop lying on the tines can bear on the guide plates, and, towards the rear of the device, the crop can be deposited on these guide plates, from where it is picked-up substantially immediately by an elevator (not shown) and raised to the loading space 56. These guide plates 64 may also be used in the preceding embodiments of the device. The working width of the device is about 150 centimeters.

As a matter of course, the device may also be employed in a baler or a harvester for picking-up crop.

FIG. 9 shows a schematic sectional view of an embodiment which to some extent resembles the tedder according to FIG. 3. Shafts 65 are rotatably supported by a carrier 66 which can be driven about a horizontally disposed axis 67, which extends transversely to the intended direction of travel A.

A sun wheel 68 coaxially surrounds the axis 67 and meshes with three pinions 69 which are rotatable about the center-lines of stub shafts 70. The shafts 70 are rotatably supported by the carrier 66. Each of the pinions 69 meshes with a pinion 71. The three pinions 71 are located near the circumference of the carrier 66 and each of them is rigidly connected to a corresponding shaft 65, which extends parallel to the axis 67. Each shaft 65 supports a row of tines 72, each of which having a shape according to the shape of the tines 31 which are previously described; also the position of the tine which is nearest to the ground, is the same as in the case of tine 31 according to FIG. 3. In this embodiment, however, each shaft 65 supports a row of single tines 72.

The diameter of the pitch circle of pinion 68 is equal to that of the pitch circle of pinions 71.

In operation, the carrier 66 is driven in the direction B about axis 67. Pinion 68 remains stationary and drives pinions 69 as their shafts 70 rotate with the carrier. The pinions 69 drive the pinions 71 in such a way that the three sets of tines 72 rotate with respect to the carrier 66 with a rotational speed which equals the speed of the carrier 66 about the axis 67 (but in opposite direction), as the diameters of the pitch circles of pinions 68 and 71 are equal. Therefore, during rotation the tines 72 maintain their attitudes relative to the ground surface, as indicated in FIG. 9. In its lowest position each tine will generally touch the ground while moving between the stubbles in a direction that is substantially parallel to its own direction and parallel to the intended direction of travel. The crop shove on the upper side of the tine and then are moved upwardly in the direction B. Each row of tines maintains its attitude relative to the ground surface, each tine will be withdrawn between neighbouring ring-shaped strippers 73 which are disposed coaxially about the axis 67. The radius of each stripper 73 exceeds the distance between the center lines of axes 65 and 67.

The crop are stripped off the tines near the upper side of the carrier 66 and tumble in a rearward direction on the ground.

While various features of the machines that have been described, and that are illustrated in the drawings, will be set forth in the following claims as inventive features, it is to be noted that the invention is not necessarily limited to these features and that it encompasses all of the features that have been described both individually and in various combinations.

I claim:

1. A hay machine for working crop lying on the ground comprising a frame and a tine carrier mounted on said frame for rotation about a first horizontal axis, elongated tines mounted on said carrier and said tines being turnable about a second horizontal axis spaced from said first axis, driving means, including a transmission of engaged gears connected to rotate said carrier together with tines about the first axis and the tines about said second axis, said driving means being connected to rotate said carrier in a forward direction through a generally circular path with respect to the direction of machine travel, and orientate said tines forwardly and generally horizontally while being moved through the lower portion of said path, adjacent the ground to pick up crop on the ground, said transmission being connected to rotate the tines during rotation of the carrier in a relative opposite direction from that of the carrier, said tines being rotated to lift crop up and over the carrier and deposit same to the rear thereof.

2. A hay machine as claimed in claim 1, in which each tine is tipped and has an adjacent lower edge at least part of which extends horizontally when it occupies a position in which it is nearest the ground.

3. A hay machine as claimed in claim 2, in which said part adjoins a further part of the lower edge and said further part curves rearwardly and upwardly away from the first mentioned part when said tine is adjacent the ground.

4. An implement as claimed in claim 1, wherein said crushing members are pivotable to an inoperative position and away from the path of tine movement.

5. A hay machine as claimed in claim 4, in which said carrier is mounted on a rotary shaft and a sun wheel on the rotary shaft axis comprises a planetary gear wheel system that interconnects the rotary shaft to said shafts, said wheel being fixed with respect to said frame during rotation of the carrier.

6. A hay machine as claimed in claim 1, in which said sun wheel is rotatably adjustable with respect to said carrier and is fixable in any one of a plurality of operative positions to change the orientation of the tines.

7. A hay machine as claimed in claim 4, in which the rows of tines are turned and oppositely positioned tine end portions are moved alternatively into operative positions during rotation of said carrier.

8. A hay machine for working crop lying on the ground comprising a frame and a tine carrier mounted on said frame for rotation about a first horizontal axis, rows of tines mounted on respective shafts that define further axes about which said rows turn during rotation about said first axis, said shafts being spaced from said first axis, during means connected to rotate said carrier and move the tines through a generally circular path, said tines being moved forwardly in their lowermost positions and simultaneously turned in a relatively opposite direction to the direction of carrier rotation to successively pick up crop adjacent the ground at the front of the support and deposit the crop to the rear thereof, each tine being elongated and having two pointed end portions, one on each side of its respective shaft, said driving means being connected to turn said tine and alternately position first one end portion forwardly and then the other end portion forwardly in the tine's lowermost position during rotation of said carrier through successive rotational cycles.

9. A hay machine as claimed in claim 8, in which the tines in each row are rigidly connected together along the length of the respective shaft.

10. A hay machine as claimed in claim 8, in which said tine is flat and the plane thereof is upwardly extending.

11. An implement for travel over the ground and working crop lying on the ground, comprising a frame and driving means connected to a tine carrier, said carrier being mounted for rotational movement about a first substantially horizontal axis on said frame, steerable tines mounted on respective rotary shafts journalled on said carrier, said tines being pointed and said driving means connected to steer said tines and orientate pointed tips of said tines forwardly when moved forwardly through paths adjacent the ground with respect to the normal direction of implement travel, said driving means connected to rotate the carrier and tines as a unit in one direction and the rotary shafts in a relatively opposite direction, the rotational speed of each shaft with tines being about half that of said carrier.

12. A implement as claimed in claim 11, wherein said carrier comprises a hollow end that houses a sun and planet gear system, said hollow end including a triangular plate and a row of tines on respective shafts being journalled adjacent each of the three corners of the plate, said carrier being rotatable as a unit about a first shaft that mounts a sun gear, and said respective shafts being connected to planet gears.

* * * * *